(12) United States Patent
Shimizu et al.

(10) Patent No.: US 6,854,124 B2
(45) Date of Patent: Feb. 8, 2005

(54) DISK DRIVE UNIT WITH TRAY BEING RETRACTABLE AND EJECTABLE FROM A MAIN BODY

(75) Inventors: Hidetoshi Shimizu, Nagano (JP); Shinya Takizawa, Nagano (JP)

(73) Assignee: Shinano Kenshi Kabushiki Kaisha, Nagano (JP)

(*) Notice: Subject to any disclaimer, the term of this patent is extended or adjusted under 35 U.S.C. 154(b) by 0 days.

(21) Appl. No.: 10/164,408

(22) Filed: Jun. 10, 2002

(65) Prior Publication Data

US 2002/0186640 A1 Dec. 12, 2002

(30) Foreign Application Priority Data

Jun. 11, 2001 (JP) ........................................ 2001-176128

(51) Int. Cl.[7] .............................................. G11B 17/03
(52) U.S. Cl. .................................................... 720/606
(58) Field of Search .............................. 720/606, 607, 720/613, 603; 369/244, 75.2, 75.1, 77.1, 77.2, 224, 247, 249; 367/224; 360/99.02, 99.03, 99.07, 99.06

(56) References Cited

U.S. PATENT DOCUMENTS

| | | | | |
|---|---|---|---|---|
| 4,805,770 A | * | 2/1989 | Grobecker et al. | ...... 206/308.1 |
| 5,933,408 A | * | 8/1999 | Park et al. | ................... 369/271 |
| 6,226,250 B1 | * | 5/2001 | Tsai et al. | ................... 369/77.1 |
| 6,400,669 B1 | * | 6/2002 | Lee | ............................ 369/77.1 |
| 6,480,453 B2 | * | 11/2002 | Ahn | ........................... 369/75.2 |
| 6,654,326 B1 | * | 11/2003 | Park et al. | ................ 369/53.19 |
| 2003/0081534 A1 | * | 5/2003 | Omori | ......................... 369/263 |

FOREIGN PATENT DOCUMENTS

| | | | |
|---|---|---|---|
| JP | 08221863 | * | 8/1996 |
| JP | 09223348 A | | 8/1997 |

* cited by examiner

*Primary Examiner*—Angel Castro
(74) *Attorney, Agent, or Firm*—Birch, Stewart, Kolasch & Birch, LLP

(57) ABSTRACT

The disk drive unit of the present invention comprises: a main body; a tray including a disk accommodating section in which an optical disk is held, the tray being retracted into and ejected from the main body; and a driving mechanism for driving the tray. The driving mechanism automatically retracts the tray into and ejects the tray from the main body. The driving mechanism moves the tray when the tray is pushed toward inside of the main body. With this structure, no button for ejecting and retracting the tray is required, and the tray can be ejected and retracted by the same action.

16 Claims, 9 Drawing Sheets

DISK DRIVE UNIT WITH TRAY BEING RETRACTABLE AND EJECTABLE FROM A MAIN BODY

BACKGROUND OF THE INVENTION

The present invention relates to a disk drive unit, more precisely relates to a disk drive unit having a tray capable of holding an optical disk and being retracted into and ejected from a main body.

The disk drive unit reproduces data from and records data on an optical disk, e.g., CD, DVD. Generally, the optical disk is mounted on the tray and loaded in the disk drive unit.

A conventional disk drive unit is shown in FIGS. 9 and 10.

In the conventional disk drive unit 10, a tray 12 can be ejected forward from a front face of a main body 11. The tray 12 has a disk accommodating section 13, in which an optical disk is held. To eject the tray 12 from the main body 11, a user pushes an eject button 14, which is provided in a front face 11a of the main body 11 and located under the tray 12.

The eject button 14 is usually provided in the front face 11a and located under the tray 12 because of parts arrangement and cable arrangement.

A driving mechanism (not shown), which is provided in the disk drive unit 10 and automatically moves the tray 12, is actuated by pushing the eject button 14. The driving mechanism includes a motor for moving the tray 12.

FIG. 10 shows a state in which the tray 12 is ejected by pushing the eject button 14.

Since the eject button 14 is provided under the tray 12, the tray 12 which has been ejected obstructs user's action of pushing the eject button 14. Therefore, it is difficult to push the eject button 14 so as to retract the tray 12.

As described above, in the conventional disk drive unit shown, the tray cannot be retracted by easy operation of the eject button.

To easily retract the tray, in some disk drive units, the moving mechanism can be actuated by slightly pushing a front face of the ejected tray.

Namely, the user of the conventional disk drive unit must execute different action so as to eject and retract the tray, so the user, especially an unfamiliar user, must be confused.

In a book-size personal computer, an eject button is provided in a front face of a tray, but the eject button is not used for retracting the tray. The tray is manually pushed until the tray is fully retracted in a disk driving unit.

In the conventional book-size personal computer too, the tray is ejected and retracted by user's different action, so the user must be confused.

SUMMARY OF THE INVENTION

The present invention was invented to solve the problem of the eject button of the conventional disk drive unit. An object of the present invention is to provide a disk drive unit, in which a tray can be ejected and retracted by the same action.

Namely, the disk drive unit of the present invention comprises:
a main body;
a tray including a disk accommodating section in which an optical disk is held, the tray being retracted into and ejected from the main body; and
means for driving the tray, the driving means automatically retracting the tray into and ejecting the same from the main body,
wherein the driving means moves the tray when the tray is pushed toward inside of the main body.

With this structure, no button for ejecting and retracting the tray is required. Further, the tray can be ejected and retracted by the same action: pushing the tray inward as the eject button.

The disk drive unit may further comprise:
means for detecting movement of the tray; and
a control section being connected to the driving means and the detecting means, the control section actuating the driving means when the detecting means detects the movement of the tray toward the inside of the main body.

With this structure, the detecting means detects if the tray is moved inward or not, so that the control section controls the driving means to automatically eject or retract the tray. In the disk drive unit, the control section may control the driving means to eject the tray when the detecting means detects the movement of the tray, which has been retracted in the main body, toward the inside of the main body, and
the control section may control the driving means to retract the tray when the detecting means detects the movement of the tray, which has been ejected from the main body, toward the inside of the main body.

With this structure, in the both cases of ejecting and retracting the tray, the control section can securely control the driving means when the tray is moved toward the inside of the main body.

In the disk drive unit, the detecting means may include:
two projections being provided to a forward part and a rear part of the tray respectively; and
two switching members being provided in the main body and adjacently arranged in the longitudinal direction of the main body,
wherein one of the switching members located on the forward side may contact the projection located in the forward part while the tray is retracted in the main body, the both of the switching members may contact the projection located in the forward part when the tray is inwardly moved therefrom, and
wherein the other switching member located on the rear side may contact the projection located in the rear part while the tray is ejected from the main body, the both of the switching members may leave from the projection located in the rear part when the tray is inwardly moved therefrom.

With this structure, the detecting means can securely detects the movement of the tray.

In the disk drive unit, the tray may be detachably attached to the main body. With this structure, maintenance of the disk drive unit can be easily executed.

The disk drive unit may further comprise:
a chassis being provided in the main body, the chassis being tilted so as to move close to and away from the optical disk accommodated in the main body;
a sliding member being provided to an end section of the chassis, the sliding member sliding in the transverse direction with respect to the main body;
a pusher pin being upwardly projected from the sliding member; and
a guide groove being formed in a bottom face of the tray, the guide groove slidably accommodating the pusher pin and guiding the pusher pin in the transverse direction with the ejection and the retraction of the tray,
wherein the guide groove may include: a longitudinal groove section being extended in the longitudinal direction of the tray so as to guide the pusher pin in the longitudinal direction; and a transverse groove section being perpendicularly formed with respect to the longitudinal groove section so as to guide the pusher pin in the transverse direction, the transverse groove section having a narrow part and a wide part, which is extended from the narrow part toward an inner end of the tray so as to allow the tray to move inward while the pusher pin is in the transverse groove section.

With this structure, the pusher pin never obstructs the movement of the tray toward the inside of the main body. When the tray is moved inward, the pusher pin is in the wide part, so that the tray can be moved. Therefore, the tray can be used as an eject button. In the disk drive unit, a diagonal wall, which is diagonally arranged with respect to the longitudinal direction of the tray, may connect an inner front face of the narrow part with an inner front face of the wide part. With this structure, the pusher pin moves from the narrow part to the wide part while the tray is retracted, so the pusher pin is not immediately pushed into the wide part by inertia caused by retracting the tray when the pusher pin moves from the longitudinal groove section to the transverse groove section. The diagonal wall smoothly introduces the pusher pin from the inner front face of the wide part to the narrow part without engaging any parts when the tray is once moved inward and ejected from the main body.

The disk drive unit may further comprise a vibration absorbing member being provided between a rear end of the tray and the main body so as to absorb vibration of the tray. With this structure, the vibration of the tray can be prevented, and an error of the detecting means can be prevented.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

Figure 1:
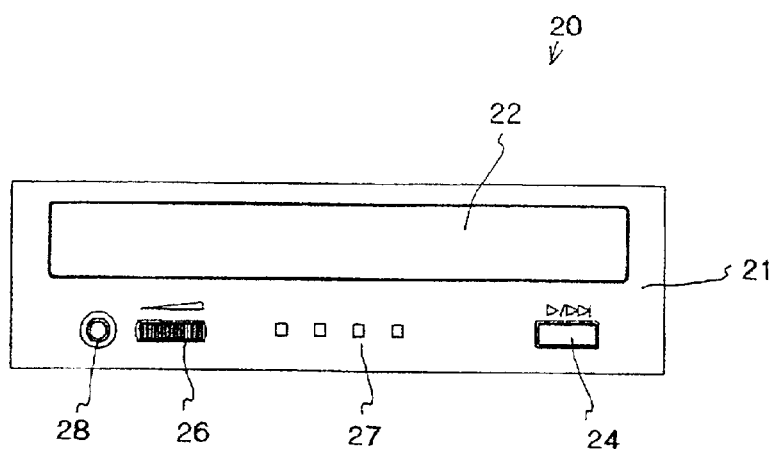
FIG. 1 is a front view of a disk drive unit of an embodiment of the present invention.
Figure 2:
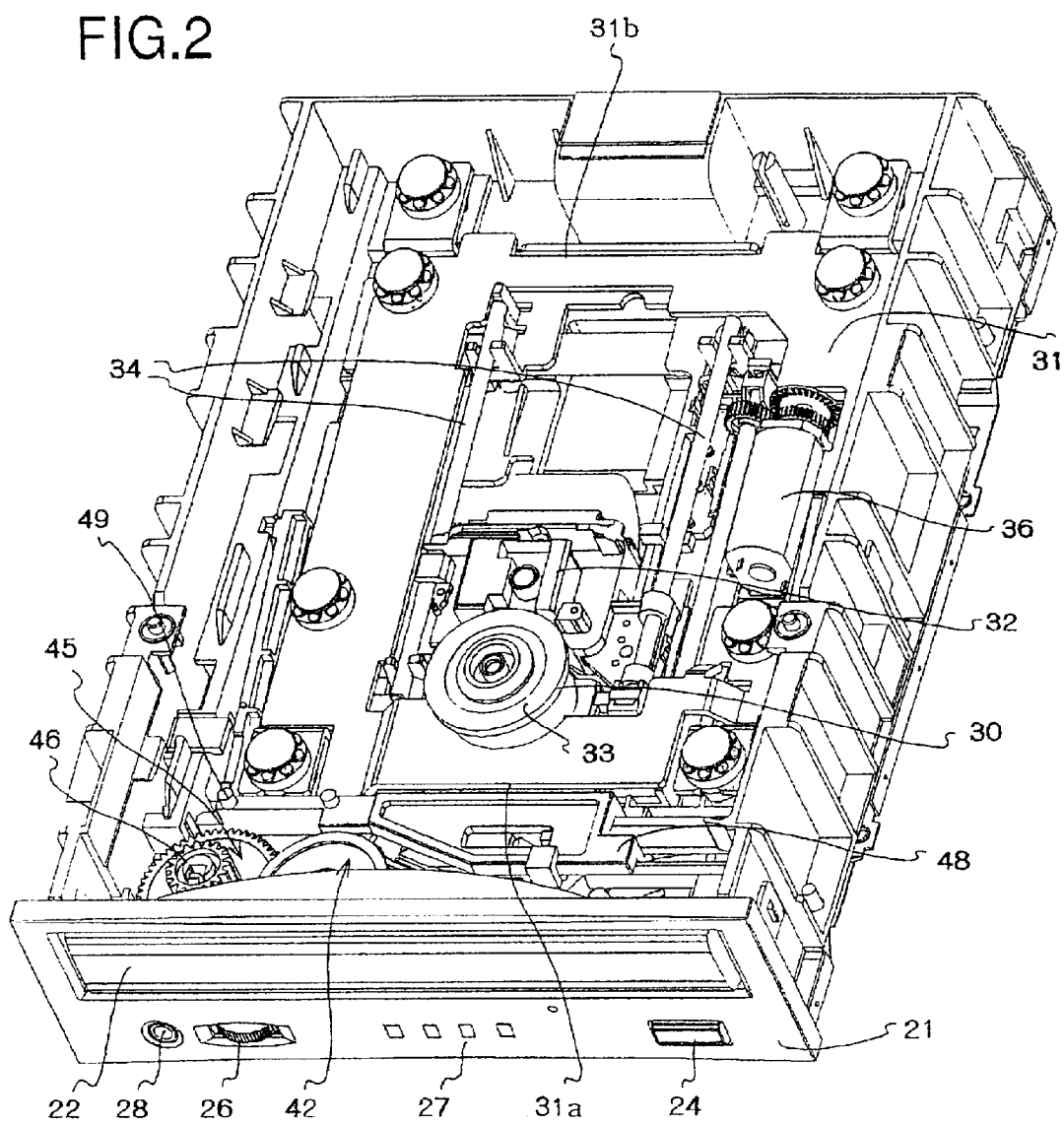
FIG. 2 is a perspective view of the disk drive unit.

FIG. 1 is a front view of a disk drive unit of the present embodiment; FIG. 2 is a perspective view of the disk drive unit.

The disk drive unit 20 records data on an optical disk, e.g., CD, DVD, and reproduces the data therefrom.

A tray 22, on which the optical disk is mounted, is ejected from and retracted into a main body 21 of the disk drive unit 20.

The tray 22 acts as a switch for ejecting and retracting the tray 22. Therefore, as shown in FIG. 1, no eject button is provided in a front face of the main body 21. In the disk drive unit 20, a user pushes a front face of the tray 22 so as to eject and retract the tray 22.

A symbol 24 stands for a play button provided in the front face of the main body 21; a symbol 26 stands for a slide volume; a symbol 27 stands for a play indicator emitting light while reproducing data; and a symbol 28 stands for a ear phone socket.

Note that, a main part of the tray 22 except the front face is not shown in FIG. 2.

A metallic chassis 31 is provided in the main body 21 of the disk drive unit 20. A spindle motor 31 for rotating the optical disk and an optical pick up 32 for reading data recorded on the optical disk are provided in the chassis 31.

A turn table 33, on which the optical disk is mounted, is connected to a shaft of the spindle motor 30.

The optical pick up 32 is moved along a pair of guide shafts 34 by a motor 36.

The chassis 31 is tilted by a tilting mechanism. A rear end 31b of the chassis 31 acts as a fulcrum point, so a front end 31a of the chassis 31 is moved upward and downward.

When the tray 22 is retracted in the main body 21, the tilting mechanism moves the chassis 31 upward and close to the tray 22, so that the optical disk is clamped between the turn table 33 and a chucking pulley (not shown). Data are recorded on and reproduced from the optical disk in the state that the optical disk is clamped by tilting the chassis 31.

When the tray 22 is ejected from the main body 21, the tilting mechanism moves the chassis 31 downward and away from optical disk. With this action, the optical disk is released and can be taken out from the tray 22.

A sliding member 48 is provided to the front end 31a of the chassis 31 and capable of sliding sideward.

The sliding member 48 has a long hole (not shown), which is extended sideward and capable of accommodating a guide pin (not shown) extended forward from the front end 31a of the chassis 31. The long hole comprises an upper section, a lower section and a diagonal section which connects the upper section with the lower section. The guide pin is moved between the upper section and the lower section with the sliding action of the sliding member 48. With this structure, the front end 31a of the chassis 31 having the guide pin is capable of tilting upward and downward.

Note that, the guide pin and the long hole (not shown) constituting the tilting mechanism have been employed in the conventional disk drive unit.

The sliding member 48 is slid sideward by the tray 22 ejected or retracted.

A pusher pin 49 is upwardly extended from an upper face of the sliding member 48. The pusher pin 49 is slidably fitted with a guide groove 58 (see FIGS. 7 and 8) formed in a bottom face of the tray 22.

When the tray 22 is ejected or retracted, the pusher pin 49 is moved sideward along the guide groove 58, so that the sliding member 48 is moved sideward.

A control section for ejecting and retracting the tray 22 will be explained with reference to FIG. 3.

Figure 3:
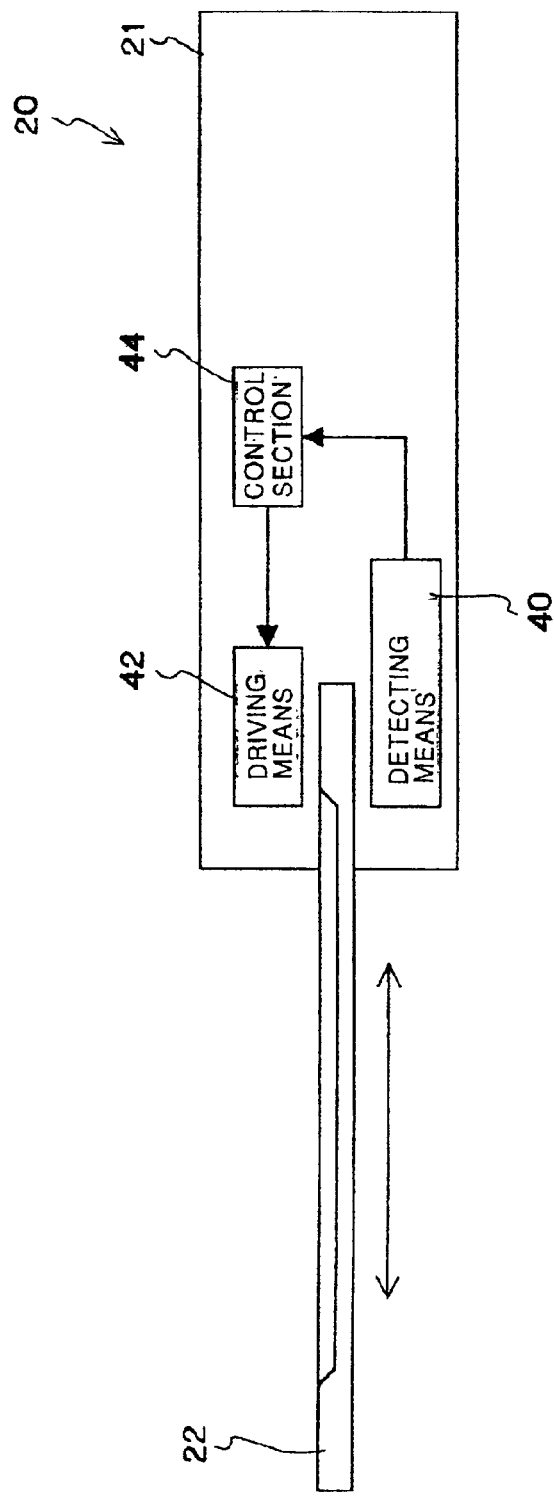
FIG. 3 is a block diagram of a control circuit for controlling ejection and retraction of a tray.

As shown in FIG. 3, the disk drive unit 20 comprises: detecting means 40 capable of detecting the movement of the tray 22; driving means 42 including a motor (not shown) for automatically ejecting and retracting the tray 22; and a control section 44 controlling the driving means 42 on the basis of results of detection of the detecting means 40.

The driving means 42 has: the motor (not shown) for automatically ejecting and retracting the tray 22 without user's manual action; and a gear unit 45 including a plurality of gears for transmitting torque of the motor to the tray 22.

A gear 46 of the gear unit 45 engages with a rack 47 (see FIGS. 7 and 8) provided to the bottom face of the tray 22, so that the rack 47 can be moved in the longitudinal direction together with the tray 22.

Successively, the ejection and the retraction of the tray 22 and function of the detecting means 40 will be explained with reference to FIGS. 4–6.

Two projections 50 and 55 are upwardly projected from a side part of an upper face of the tray 22. The projections 50 and 55 are arranged in the longitudinal direction of the tray 22.

The detecting means 40 includes two switching members 52a and 52b, e.g., limit switches, for detecting the projections 50 and 55 of the tray 22. The switching members 52a and 52b are adjacently arranged in the longitudinal direction of the main body 21. With this structure, the switching members 52a and 52b are capable of detecting the movement of the tray 22. Namely, the projections 50 and 55 contact the switching members 52a and 52b with the ejection and the retraction of the tray 22. The ejection or the retraction of the tray 22 can be known by detecting the states of the switching members 52a and 52b.

Figure 4:
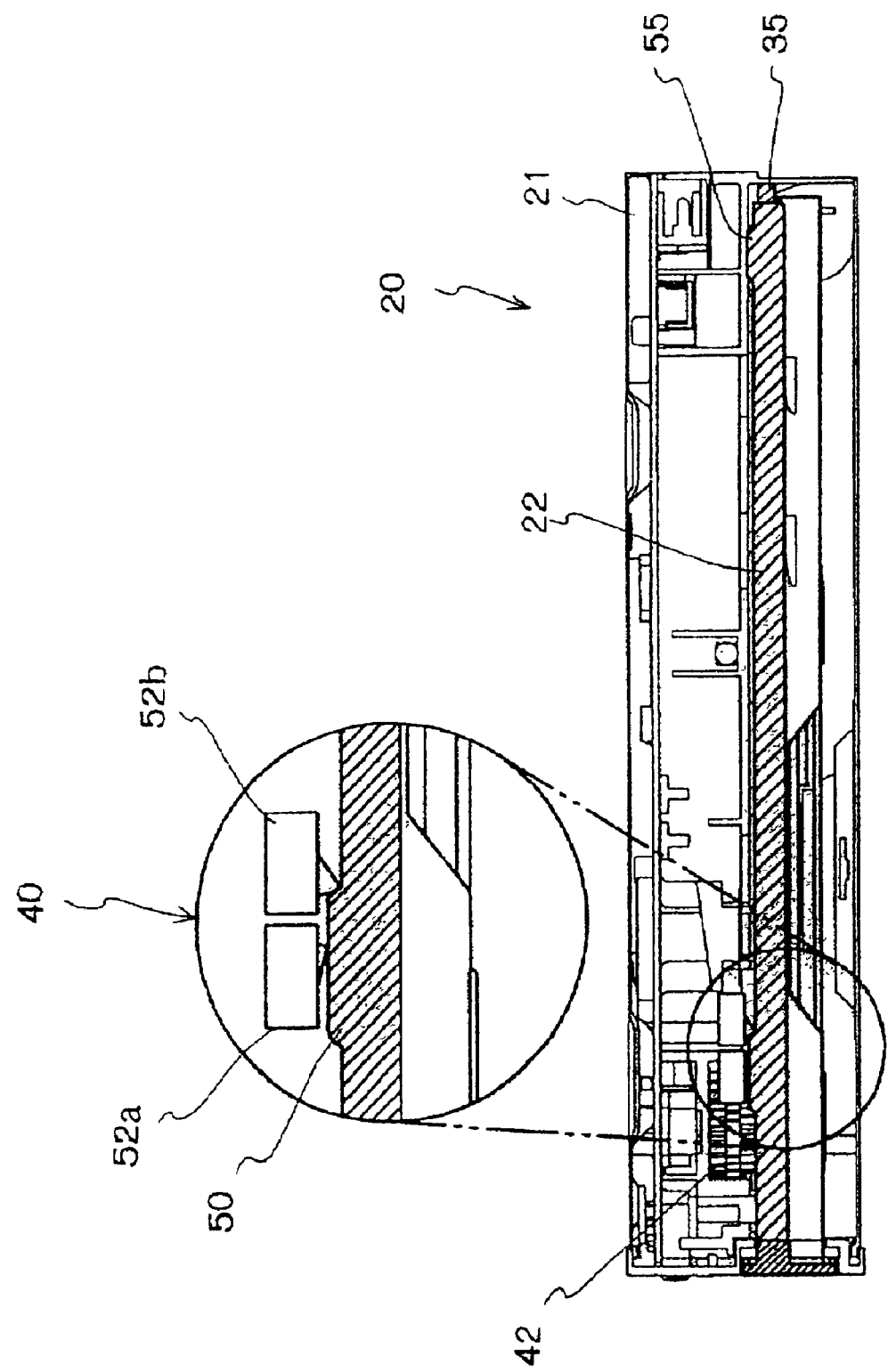
FIG. 4 is a side sectional view of the disk drive unit, in which the tray is retracted in a main body.

FIG. 4 shows the state in which the tray 22 is retracted in the main body 21.

While the tray 22 is retracted, the forward switching member 52a is turned on by the forward projection 50; the rear switching member 52b is left from the rear projection 55 and turned off. Namely, the retraction of the tray 22 can be known by detecting turn-on of the switching member 52a and turn-off of the switching member 52b.

When the switching member 52a is turned on and the switching member 52b is turned off, the control section 44 judges that the tray 22 is not pushed or moved inward, so that the control section 44 does not control the driving means 42.

Figure 5:
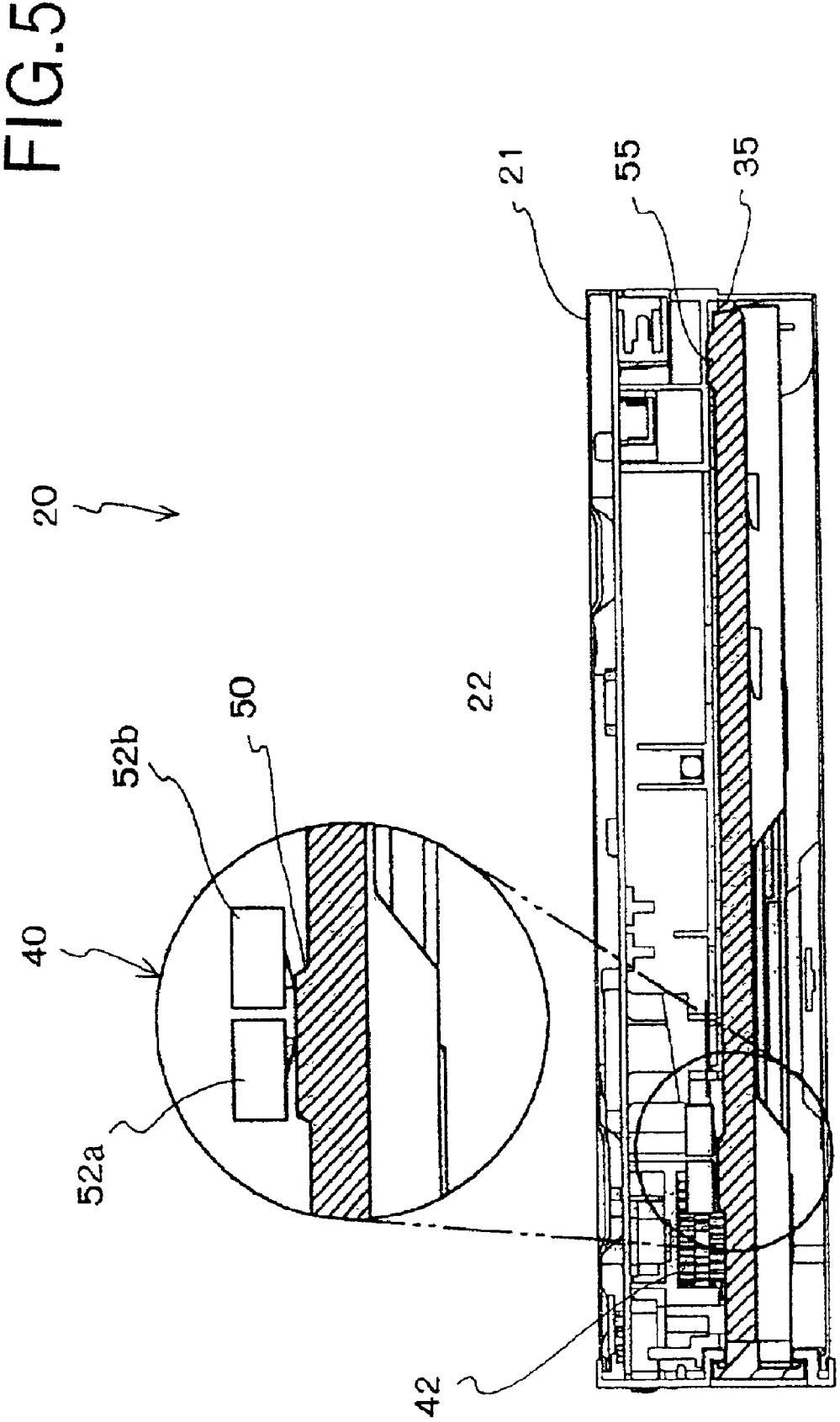
FIG. 5 is a side sectional view of the disk drive unit, in which the tray retracted is further moved inward.

In FIG. 5, the user slightly pushes the tray 22, which has been retracted as shown in FIG. 4, inward so as to eject the tray 22.

By pushing the tray 22 inward, the rear switching member 52b contacts the forward projection 50, so that the both of the switching members 52a and 52b are turned on.

When the control section 44 detects that the switching member 52a, which has been turned on, and the switching member 52b, which has been turned off, are turned on, the control section 44 sends a signal for ejecting the tray 22 to the driving means 42. Then, the driving means 42 rotates the motor so as to eject the tray 22 forward.

Figure 6:
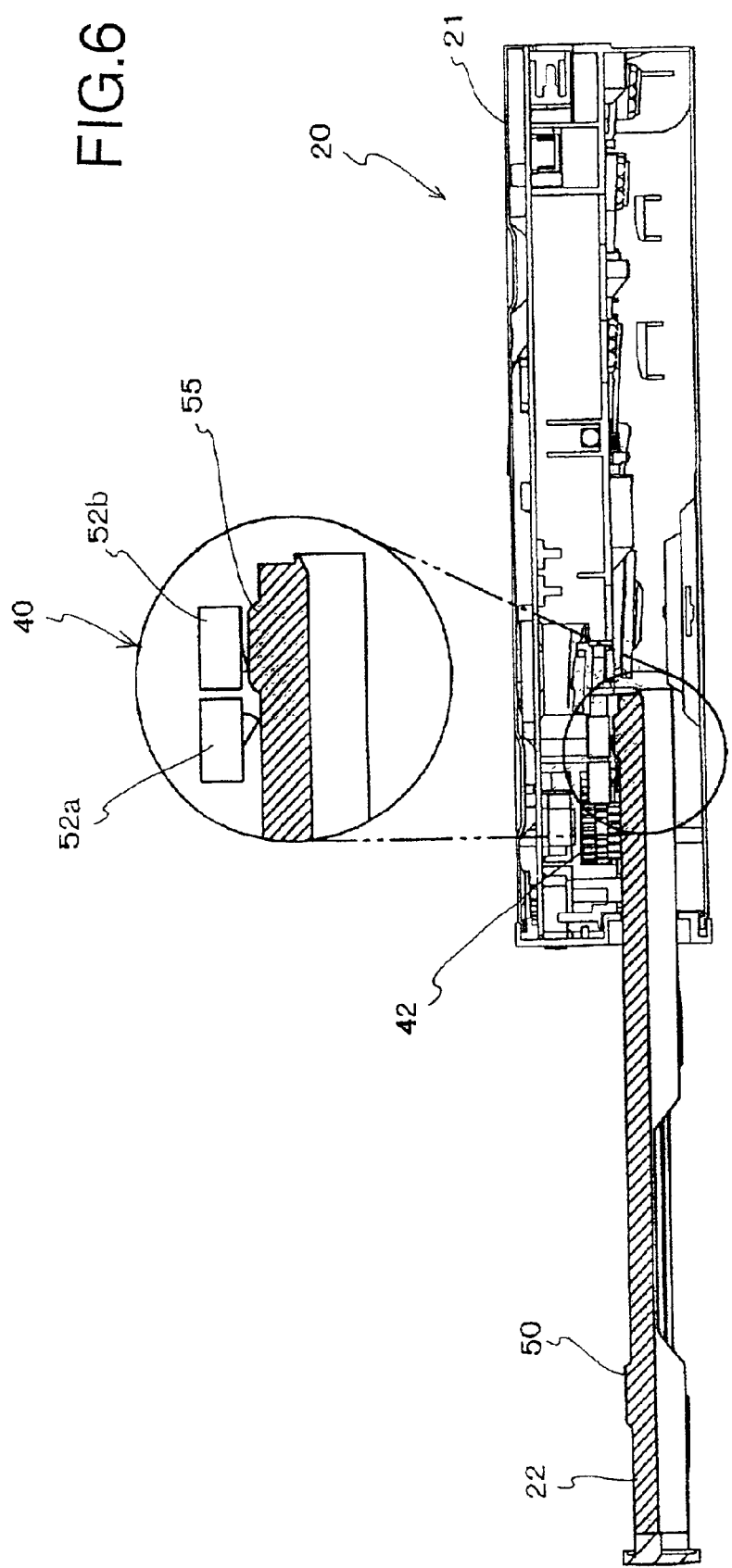
FIG. 6 is a side sectional view of the disk drive unit, in which the tray is ejected from the main body.

The state of ejecting the tray 22 is shown in FIG. 6.

The driving means 42 ejects or outwardly moves the tray 22 until reaching a prescribed position. Upon reaching the prescribed position, the motor of the driving means 42 is stopped.

The control section 44 judges if the ejected tray 22 reaches the prescribed position or not by the switching members 52a and 52b.

Namely, the rear projection 55 of the tray 22 contacts the rear switching member 52b when the ejected tray 22 reaches the prescribed position, so that the switching member 52b is turned on.

When the rear switching member 52b is turned on, the control section 44 judges that the tray 22 reaches the prescribed position, then the control section 44 sends a stop signal to the driving means 42.

Upon receiving the stop signal, the driving means 42 stops the motor, so that the retraction of the tray 22 is stopped at the prescribed position.

The user can set or change the optical disk at the prescribed position.

After the user sets the optical disk in the tray 22, the user pushes the tray 22 inward. By pushing the tray 22 inward, the rear projection 55 is left from the rear switching member 52, so that the both switching members 52a and 52b are turned off.

When the control section 44 detects that the switching member 52a, which has been turned off, and the switching member 52b, which has been turned on, are turned off, the control section 44 sends a signal for ejecting the tray 22 to the driving means 42. Then, the driving means 42 rotates the motor so as to retract the tray 22 backward.

Upon receiving the ejecting signal, the driving means 42 rotates the motor in the opposite direction so as to retract the tray 22 in the main body 22.

The tray 22 is inwardly moved until the forward projection 50 contacts the forward switching member 52a. Then, the forward switching member 52a is turned on.

When the control section 44 detects that the forward switching member 52a is turned on, the control section 44 sends the stop signal to the driving means 42 so as to stop the retraction of the tray 22.

As shown in FIGS. 4 and 5, a vibration absorbing member 35, which is capable of absorbing vibration of the tray 22, is provided between the rear end of the tray 22 and an innermost face of the main body 21.

By the vibration absorbing member 35, the vibration and play of the tray 22 can be prevented, so that errors of the detecting means 40 can be prevented.

A spring, a rubber member, etc. may be employed as the vibration absorbing member 35.

The vibration absorbing member 35 is compressed when the tray 22 is pushed inward. Preferably, the vibration absorbing member 35 applies proper counter force to the user's hand via the tray 22 when the user inwardly pushes the tray 22 instead of the eject button.

Figure 7:
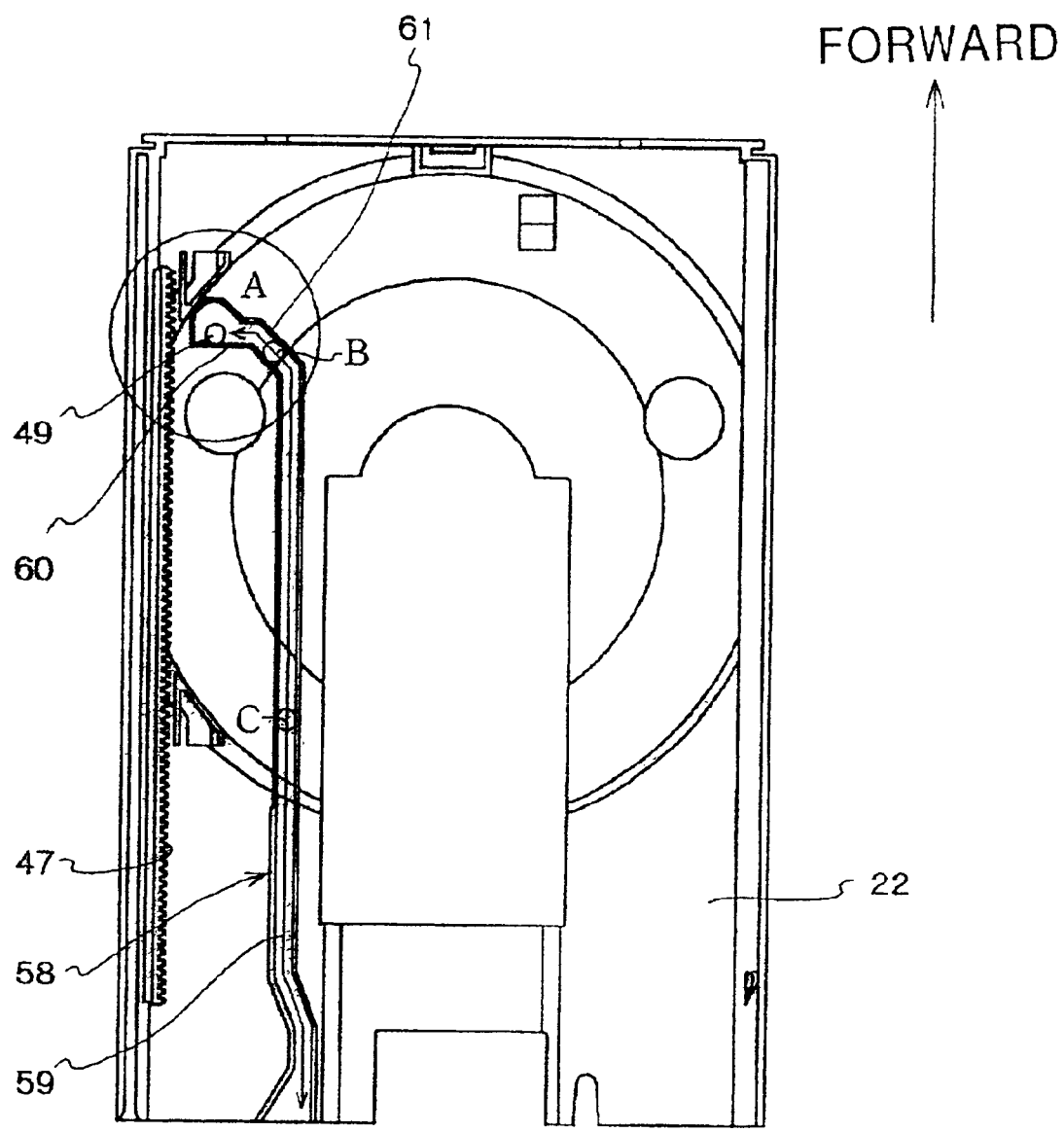
FIG. 7 is a bottom view of the tray.

The guide groove 58 of the tray 22 will be explained with reference to FIG. 7.

The guide groove 58 is formed in the bottom face of the tray 22 and comprises: a longitudinal groove section 59 extended in the longitudinal direction of the tray 22; a transverse groove section 60 perpendicularly formed with respect to the longitudinal groove section 59; and a diagonal groove section 61 connecting the longitudinal groove section 59 with the transverse groove section 60.

As described above, the pusher pin 49 of the sliding member 48 is slidably fitted in the guide groove 58 so as to sidewardly slide the sliding member 48 and tilt the chassis 31.

Action of the tray 22 and the pusher pin 49 for tilting the chassis 31 will be explained.

While the tray 22 is retracted, the pusher pin 49 is located at a position "A" (see FIG. 7) in the transverse groove section 61. When the tray 22 is ejected forward, the pusher pin 49 is moved to a position "B" in the diagonal groove section 61 along the guide groove 58. By moving the pusher pin 49 from the transverse groove section 60 to the diagonal groove section 61, the sliding member 48 is slid sideward, so that the front end 31a of the chassis 31 is moved downward.

With further ejecting the tray 22, the pusher pin 49 is moved to a position "C" in the longitudinal groove section 59. Since the pusher pin 49 cannot move sideward in the longitudinal groove section 59, the front end 31a of the chassis 31 is located at the lowest position until the tray 22 is completely ejected.

On the other hand, in the case of retracting the tray 22, firstly the pusher pin 49 is located in the longitudinal groove section 59, and the front end 31a of the chassis 31 is located at the lowest position. With further retracting the tray 22, the pusher pin 49 is moved in the diagonal groove section 61 and gradually moved sideward. Therefore, the sliding member 48 is gradually moved sideward, and the front end 31a of the chassis 31 is gradually moved upward.

When the tray 22 is completely retracted in the main body 21, the pusher pin 49 is located in the transverse groove section 60, and the front end 31a of the chassis 31 is located at the highest position and clamps the optical disk.

Note that, in the conventional disk drive unit, width of the transverse groove section 60 is slightly greater than outer diameter of the pusher pin 49. The conventional transverse groove section is shown by dotted lines in FIG. 8.

Figure 8:
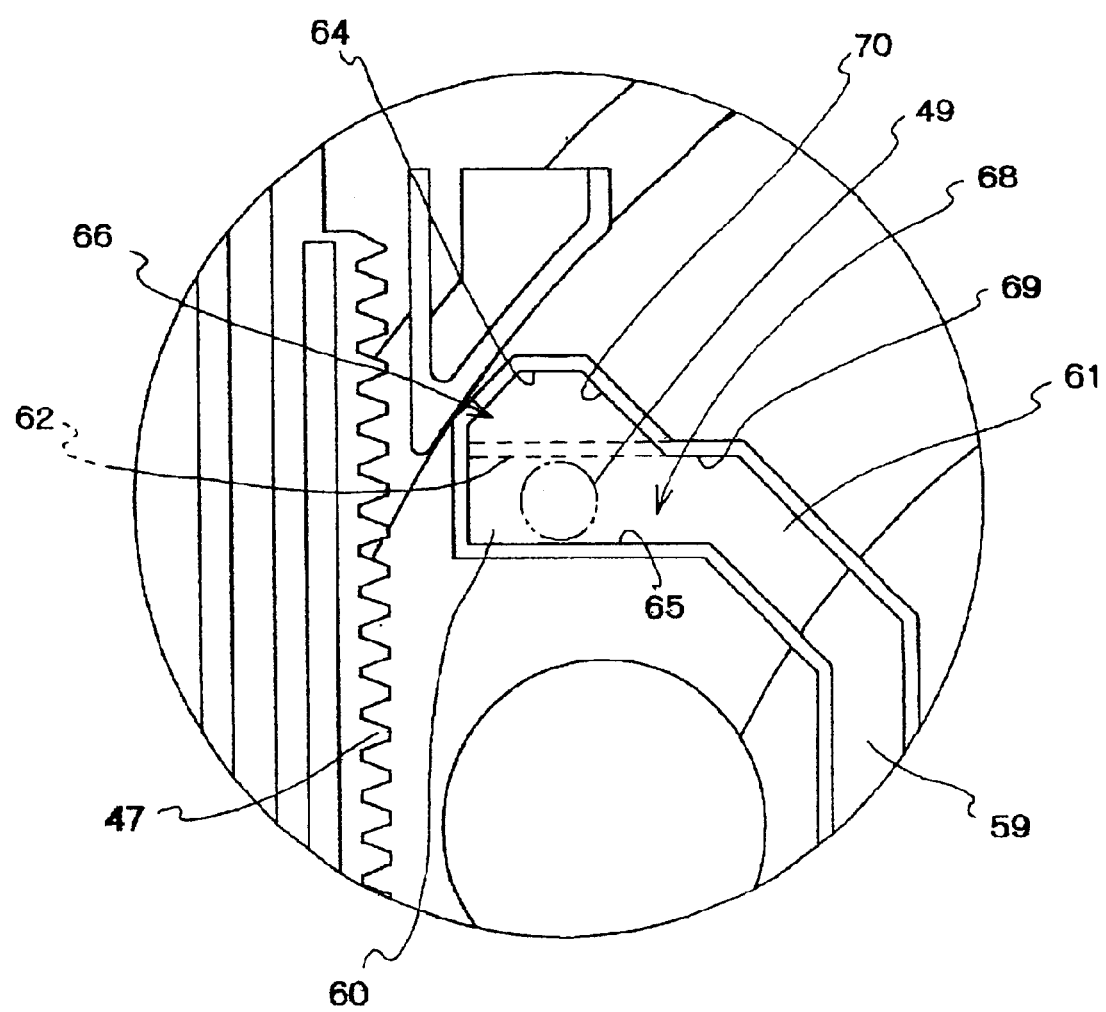
FIG. 8 is a partially enlarged view of a guide groove shown in FIG. 7.
Figure 9:
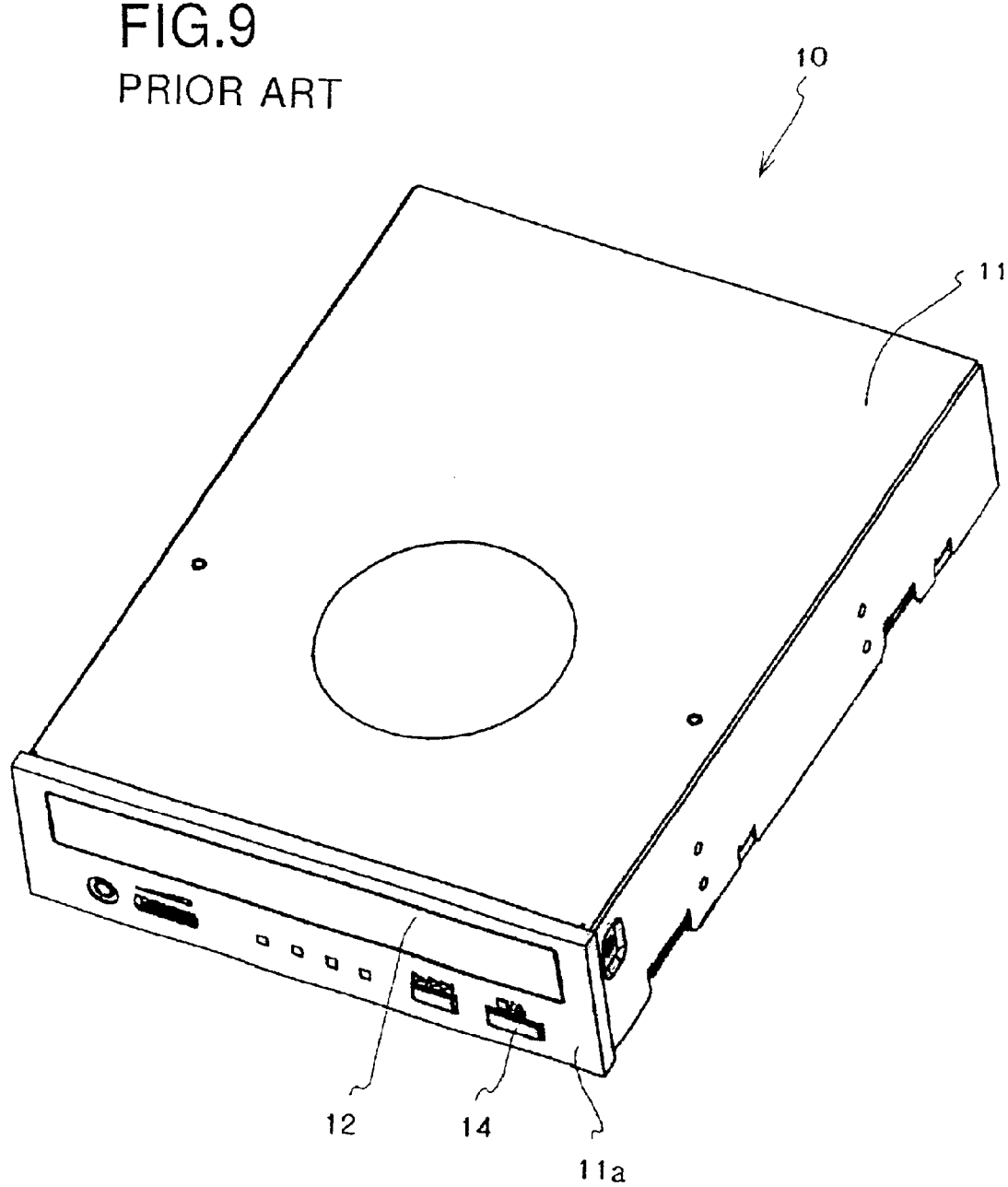
FIG. 9 is the perspective view of the conventional disk drive unit.
Figure 10:
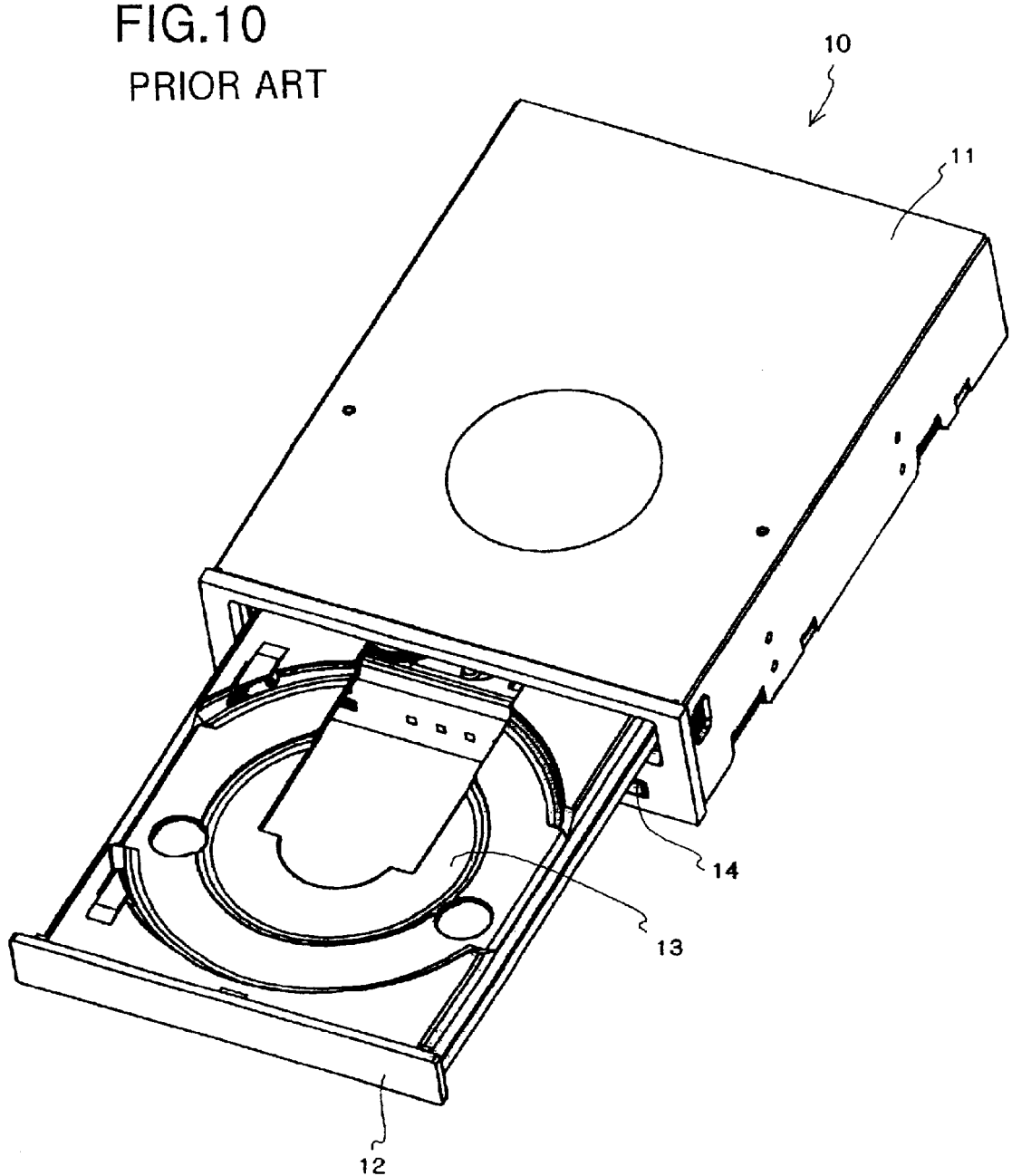
FIG. 10 is the perspective view of the conventional disk drive unit, in which the tray is ejected from the main body.

In the conventional disk drive unit, the pusher pin 49 contacts an inner front face 62 while the tray 22 is retracted in the main body 21 (see FIG. 8). Therefore, the user cannot further push the tray 22 inward, so the tray 22 cannot be used instead of the eject button.

On the other hand, in the present embodiment, the shape of the guide groove 58 is improved as clearly shown in FIG. 8, so that the user can further push the retracted tray 22 inward as the eject button. In the present embodiment, a front inner face 64 of the transverse groove section 60 is located on the inner side with respect to the conventional inner front face 62 (see FIG. 8). The transverse groove section 60 has a wide part 66, whose with is greater than that of the longitudinal groove section 59 and the diagonal groove section 61.

By forming the wide part 66, the pusher pin 49 can be inwardly moved in the wide part 66 even if the user pushes the tray 22 inward so as to eject the tray 22 while the pusher pin 49 is in the transverse groove section 60. Therefore, the tray 22 can be used instead of the eject button of the conventional disk drive unit.

There is formed a narrow part 68 between the wide part 66 of the transverse groove section 60 and the diagonal groove section 61. The width of the narrow part is slightly greater than the diameter of the pusher pin 49.

Further, a diagonal wall 70, which is diagonally arranged with respect to the longitudinal direction of the tray 22, connects an inner front face 69 of the narrow part 68 with an inner front face 64 of the wide part 66. Therefore, width of the wide part 66 is made gradually narrower toward the inner front face 64.

By forming the narrow part 68 between the wide part 66 of the transverse groove section 60 and the diagonal groove section 61, the disk drive unit 20 has a following advantage.

Namely, if no narrow part 68 is formed in the transverse groove section 60, the pusher pin 49 immediately collides with the inner front face 64 of the wide part 66 by inertia when the pusher pin 49 moves from the diagonal groove section 61 to the transverse groove section 60.

If the usher pin 49 collides with the inner front face 64 of the wide part 66, the state is equal to the state in which the user pushes the tray 22 inward so as to eject the tray 22. Therefore, the tray 22 is ejected from the main body 21, so the tray 22 cannot retracted therein.

By forming the narrow part 68, the pusher pin 49, which has been moved in the transverse groove section 60, can be held so as not to enter the wide part 66 and collide with the inner front face 64. Therefore, accidental ejection of the tray 22 can be prevented.

Further, the inner front face 69 of the narrow part 68 is connected with the inner front face 64 of the wide part 66 by the diagonal wall 70, so the tray 22 can be smoothly ejected.

Namely, the pusher pin 49, which is moved from the wide part 66 to the narrow part 68, is not engaged at a position between the wide part 66 and the narrow part 68 when the driving means 42 ejects the tray 22, so the tray 22 can be smoothly ejected without any obstructions.

If no diagonal wall 70 is formed and the wide part 66 and the narrow part 68 are connected by a straight wall parallel to the longitudinal direction of the tray 22, the pusher pin 49 is apt to be engaged with the straight wall. If the pusher pin 49 is engaged with the straight wall, the tray 22 cannot be ejected.

The projections 50 and 55 of the tray 22 contact the switching members 52a and 52b, and the rack 47 of the tray 22 is engaged with the gear 46, but no electric wires and cables are not provided in the tray 22.

Therefore, the tray 22 can be easily detached from the main body 21. So, maintenance of the main body 21 and the tray 22 can be easily executed.

If no electric wires and cables are provided in the tray 22, the tray 22 accidentally comes out from the main body 21 when the front face of the disk drive unit 20 is headed downward. However, in the present embodiment, the transverse groove section 60 has an engaging wall 65 capable of engaging with the pusher pin 49, so that the tray 22 never accidentally comes out from the main body 21 even if the front face of the disk drive unit 20 is headed downward.

In the above described embodiment, the switching members 52a and 52b are employed as the detecting means 40. In the present invention, the detecting means 40 is not limited to the switching members 52a and 52b. For example, sensor or sensors for detecting a mark or marks of the tray may be employed as the detecting means. In this case, the mark of the tray may be a concave section. Further, a contact type sensor or a non-contact type sensor may be employed as the sensor.

The invention may be embodied in other specific forms without departing from the spirit or essential characteristics thereof. The present embodiments are therefore to be considered in all respects as illustrative and not restrictive, the scope of the invention being indicated by the appended claims rather than by he foregoing description and all changes which come within the meaning and range of equivalency of the claims are therefore intended to be embraced therein.

What is claimed is:

1. A disk drive unit, comprising:
   a main body;
   a tray including a disk accommodating section in which an optical disk is held, said tray being retracted into and ejected from said main body;

means for driving said tray, said driving means automatically retracting said tray into and ejecting the same from said main body, wherein said driving means moves said tray when said tray is pushed toward inside of said main body;

means for detecting movement of said tray; and a control section being connected to said driving means and said detecting means, said control section actuating said driving means when said detecting means detects the movement of said tray toward the inside of said main body, wherein said control section controls said driving means to eject said tray when said detecting means detects the movement of said tray, which has been retracted in said main body, toward the inside of said main body, wherein said control section controls said driving means to retract said tray when said detecting means detects the movement of said tray, which has been ejected from said main body, toward the inside of said main body, and wherein said detecting means includes:
- two projections being provided to a forward part and a rear part of said tray respectively; and
- two switching members being provided in said main body and adjacently arranged in the longitudinal direction of said main body,
- wherein one of said switching members located on the forward side contacts said projection located in the forward part while said tray is retracted in said main body, the both of said switching members contact said projection located in the forward part when said tray is inwardly moved therefrom, and
- wherein the other switching member located on the rear side contacts said projection located in the rear part while said tray is ejected from said main body, the both of said switching members leave from said projection located in the rear part when said tray is inwardly moved therefrom.

2. The disk drive unit according to claim 1, wherein said tray is detachably attached to said main body.

3. A disk drive unit, comprising:

a main body;

a tray including a disk accommodating section in which an optical disk is held, said tray being retracted into and ejected from said main body;

means for driving said tray, said driving means automatically retracting said tray into and ejecting the same from said main body, wherein said driving means moves said tray when said tray is pushed toward inside of said main body;

a chassis being provided in said main body, said chassis being tilted so as to move close to and away from the optical disk accommodated in said main body;

a sliding member being provided to an end section of said chassis, said sliding member sliding in the transverse direction with respect to said main body;

a pusher pin being upwardly projected from said sliding member; and a guide groove being formed in a bottom face of said tray, said guide groove slidably accommodating said pusher pin and guiding said pusher pin in the transverse direction with the ejection and the retraction of said tray, wherein said guide groove includes:
- a longitudinal groove section being extended in the longitudinal direction of said tray so as to guide said pusher pin in the longitudinal direction; and
- a transverse groove section being perpendicularly formed with respect to the longitudinal groove section so as to guide said pusher pin in the transverse direction, said transverse groove section having a narrow part and a wide part, which is extended from the narrow part toward an inner end of said tray so as to allow said tray to move inward while said pusher pin is in the transverse groove section.

4. The disk drive unit according to claim 3, and further comprising a vibration absorbing member being provided between a rear end of said tray and said main body so as to absorb vibration of said tray.

5. The disk drive unit according to claim 3, further comprising:

means for detecting movement of said tray; and a control section being connected to said driving means and said detecting means, said control section actuating said driving means when said detecting means detects the movement of said tray toward the inside of said main body.

6. The disk drive unit according to claim 5, wherein said control section controls said driving means to eject said tray when said detecting means detects the movement of said tray, which has been retracted in said main body, toward the inside of said main body, and wherein said control section controls said driving means to retract said tray when said detecting means detects the movement of said tray, which has been ejected from said main body, toward the inside of said main body.

7. A disk drive unit, comprising:

a main body;

a tray including a disk accommodating section in which an optical disk is held, said tray being retracted into and ejected from said main body;

means for driving said tray, said driving means automatically retracting said tray into and ejecting the same from said main body, wherein said driving means moves said tray when said tray is pushed toward inside of said main body;

a chassis being provided in said main body, said chassis being tilted so as to move close to and away from the optical disk accommodated in said main body;

a sliding member being provided to an end section of said chassis, said sliding member sliding in the transverse direction with respect to said main body;

a pusher pin being upwardly projected from said sliding member; and a guide groove being formed in a bottom face of said tray, said guide groove slidably accommodating said pusher pin and guiding said pusher pin in the transverse direction with the ejection and the retraction of said tray, wherein said guide groove includes:
- a longitudinal groove section being extended in the longitudinal direction of said tray so as to guide said pusher pin in the longitudinal direction; and
- a transverse groove section being perpendicularly formed with respect to the longitudinal groove section so as to guide said pusher pin in the transverse direction, said transverse groove section having a narrow part and a wide part, which is extended from the narrow part toward an inner end of said tray so as to allow said tray to move inward while said pusher pin is in the transverse groove section,
- wherein a diagonal wall, which is diagonally arranged with respect to the longitudinal direction of said tray, connects an inner front face of the narrow part with an inner front face of the wide part.

8. The disk drive unit according to claim 7, and further comprising a vibration absorbing member being provided between a rear end of said tray and said main body so as to absorb vibration of said tray.

9. A disk drive unit, comprising:
a main body;
a tray including a disk accommodating section in which an optical disk is held, said tray being retracted into and ejected from said main body;
means for driving said tray, said driving means automatically retracting said tray into and ejecting the same from said main body, wherein said driving means moves said tray when said tray is pushed toward inside of said main body so as to retract said tray into or eject the same from said main body;
means for detecting movement of said tray; and
a control section being connected to said driving means and said detecting means, said control section actuating said driving means when said detecting means detects the movement of said tray toward the inside of said main body,
wherein said control section controls said driving means to eject said tray when said detecting means detects the movement of said tray, which has been retracted in said main body, toward the inside of said main body,
wherein said control section controls said driving means to retract said tray when said detecting means detects the movement of said tray, which has been elected from said main body, toward the inside of said main body,
wherein said detecting means includes:
two projections being provided to a forward part and a rear part of said tray respectively; and
two switching members being provided in said main body and adjacently arranged in the longitudinal direction of said main body,
wherein one of said switching members located on the forward side contacts said projection located in the forward part while said tray is retracted in said main body, the both of said switching members contact said projection located in the forward part when said tray is inwardly moved therefrom, and
wherein the other switching member located on the rear side contacts said projection located in the rear part while said tray is ejected from said main body, the both of said switching members leave from said projection located in the rear part when said tray is inwardly moved therefrom.

10. The disk drive unit according to claim 9, wherein said tray is detachably attached to said main body.

11. A disk drive unit, comprising:
a main body;
a tray including a disk accommodating section in which an optical disk is held, said tray being retracted into and ejected from said main body;
means for driving said tray, said driving means automatically retracting said tray into and ejecting the same from said main body, wherein said driving means moves said tray when said tray is pushed toward inside of said main body so as to retract said tray into or eject the same from said main body;
a chassis being provided in said main body, said chassis being tilted so as to move close to and away from the optical disk accommodated in said main body;
a sliding member being provided to an end section of said chassis, said sliding member sliding in the transverse direction with respect to said main body;
a pusher pin being upwardly projected from said sliding member; and
a guide groove being formed in a bottom face of said tray, said guide groove slidably accommodating said pusher pin and guiding said pusher pin in the transverse direction with the ejection and the retraction of said tray,
wherein said guide groove includes:
a longitudinal groove section being extended in the longitudinal direction of said tray so as to guide said pusher pin in the longitudinal direction; and
a transverse groove section being perpendicularly formed with respect to the longitudinal groove section so as to guide said pusher pin in the transverse direction, said transverse groove section having a narrow part and a wide part, which is extended from the narrow part toward an inner end of said tray so as to allow said tray to move inward while said pusher pin is in the transverse groove section.

12. The disk drive unit according to claim 11, and further comprising a vibration absorbing member being provided between a rear end of said tray and said main body so as to absorb vibration of said tray.

13. The disk drive unit according to claim 12, and further comprising a vibration absorbing member being provided between a rear end of said tray and said main body so as to absorb vibration of said tray.

14. The disk drive unit according to claim 11, further comprising:
means for detecting movement of said tray; and
a control section being connected to said driving means and said detecting means, said control section actuating said driving means when said detecting means detects the movement of said tray toward the inside of said main body.

15. The disk drive unit according to claim 14, wherein said control section controls said driving means to eject said tray when said detecting means detects the movement of said tray, which has been retracted in said main body, toward the inside of said main body, and
wherein said control section controls said driving means to retract said tray when said detecting means detects the movement of said tray, which has been ejected from said main body, toward the inside of said main body.

16. A disk drive unit, comprising:
a main body;
a tray including a disk accommodating section in which an optical disk is held, said tray being retracted into and ejected from said main body; and
means for driving said tray, said driving means automatically retracting said tray into and ejecting the same from said main body, wherein said driving means moves said tray when said tray is pushed toward inside of said main body so as to retract said tray into or eject the same from said main body;
a chassis being provided in said main body, said chassis being tilted so as to move close to and away from the optical disk accommodated in said main body;
a sliding member being provided to an end section of said chassis, said sliding member sliding in the transverse direction with respect to said main body;
a pusher pin being upwardly projected from said sliding member; and a guide groove being formed in a bottom face of said tray, said guide groove slidably accommodating said pusher pin and guiding said pusher pin in the transverse direction with the ejection and the retraction of said tray, wherein said guide groove includes:
- a longitudinal groove section being extended in the longitudinal direction of said tray so as to guide said pusher pin in the longitudinal direction; and
- a transverse groove section being perpendicularly formed with respect to the longitudinal groove section so as to guide said pusher pin in the transverse direction, said transverse groove section having a narrow part and a wide part, which is extended from the narrow part toward an inner end of said tray so as to allow said tray to move inward while said pusher pin is in the transverse groove section, wherein a diagonal wall, which is diagonally arranged with respect to the longitudinal direction of said tray, connects an inner front face of the narrow part with an inner front face of the wide part.

* * * * *